United States Patent
Suitou et al.

(10) Patent No.: US 9,973,055 B2
(45) Date of Patent: May 15, 2018

(54) ELECTRIC COMPRESSOR

(71) Applicant: Kabushiki Kaisha Toyota Jidoshokki, Kariya-shi, Aichi-ken (JP)

(72) Inventors: Ken Suitou, Aichi-ken (JP); Kazuhiro Kuroki, Aichi-ken (JP); Takuro Mizuno, Aichi-ken (JP); Tatsuya Koide, Aichi-ken (JP); Yusuke Kinoshita, Aichi-ken (JP)

(73) Assignee: KABUSHIKI KAISHA TOYOTA JIDOSHOKKI, Kariya-Shi, Aichi-Ken (JP)

(*) Notice: Subject to any disclaimer, the term of this patent is extended or adjusted under 35 U.S.C. 154(b) by 371 days.

(21) Appl. No.: 14/792,034

(22) Filed: Jul. 6, 2015

(65) Prior Publication Data
US 2016/0013701 A1 Jan. 14, 2016

(30) Foreign Application Priority Data
Jul. 11, 2014 (JP) ................... 2014-142845

(51) Int. Cl.
*H02K 5/24* (2006.01)
*H02K 11/33* (2016.01)
(Continued)

(52) U.S. Cl.
CPC ............ *H02K 5/24* (2013.01); *H02K 11/33* (2016.01); *H02K 5/225* (2013.01); *H02K 7/14* (2013.01)

(58) Field of Classification Search
CPC ............ H02K 3/52; H02K 3/522; H02K 5/22; H02K 5/225; H02K 11/00; H02K 11/33;
(Continued)

(56) References Cited

U.S. PATENT DOCUMENTS

| | | | | | |
|---|---|---|---|---|---|
| 8,303,271 | B2* | 11/2012 | Ikeda | ........... | F04B 35/04 417/366 |
| 8,618,703 | B2* | 12/2013 | Kinoshita | ........... | F04B 35/04 310/71 |
| 2011/0175470 | A1* | 7/2011 | Kinoshita | ........... | F04B 35/04 310/71 |

FOREIGN PATENT DOCUMENTS

| | | |
|---|---|---|
| JP | 2007-315374 A | 12/2007 |
| JP | 2011-252398 A | 12/2011 |

OTHER PUBLICATIONS

Communication dated Mar. 2, 2017 from the State Intellectual Property Office of the P.R.C., in counterpart Chinese application No. 201510398483.X.

* cited by examiner

*Primary Examiner* — Tran Nguyen
(74) *Attorney, Agent, or Firm* — Sughrue Mion, PLLC

(57) ABSTRACT

An electric compressor including a compression mechanism, an electric motor driving the compression mechanism, a housing accommodating the compression mechanism and the electric motor, an inverter box located on an outer surface of the housing, an inverter substrate accommodated in the inverter box and having an inverter circuit supplying electric power to the electric motor, the inverter substrate having a first surface and a second surface that is a reverse surface of the first surface, a plurality of fastening members fixing the inverter substrate to the inverter box, and a reinforcing member having a first end fixed to the inverter box and a second end soldered to the first surface or the second surface of the inverter substrate. The reinforcing member extends toward the first surface or the second surface of the inverter substrate in the inverter box. The reinforcing member is not electrically connected to the inverter circuit.

8 Claims, 4 Drawing Sheets

(51) Int. Cl.
*H02K 7/14* (2006.01)
*H02K 5/22* (2006.01)

(58) Field of Classification Search
CPC .......... F04B 35/00; F04B 35/04; F04B 39/00;
F04B 39/12; F04C 18/02; F04C 18/021;
F04C 18/0215; F04C 23/00; F04C
23/008; F04C 29/04; F04C 29/045
See application file for complete search history.

ELECTRIC COMPRESSOR

BACKGROUND OF THE INVENTION

The present invention relates to an electric compressor having an inverter device.

Japanese Patent Application Publication No. 2011-252398 discloses an electric compressor for a vehicle air conditioner. The electric compressor has a housing having therein a motor and a compression mechanism driven by the motor. An inverter box is integrally formed with the housing at the outer periphery thereof. The inverter box has therein an inverter substrate supplying electric power for driving the motor. (In the following, the inverter substrate may be referred to merely as "substrate.")

In the electric compressor thus having the inverter box integrally formed with the housing, vibration of the vehicle or the motor transmits to the inverter substrate in the inverter box, so that the inverter substrate may also be vibrated. The vibration of the inverter substrate may decrease the durability of parts mounted on the substrate, with the result that the performance of the inverter substrate may be adversely affected. The above-described electric compressor suppresses vibration by fastening the inverter substrate to the inverter box by a plurality of fasteners. Although the use of such fasteners successfully suppresses the vibration of a portion of the inverter substrate that is adjacent to the fasteners, the vibration of a portion of the inverter substrate that is remote from the fasteners cannot be suppressed successfully.

It may be contemplated to provide additional fasteners at the remote position of the substrate for suppression of the vibration. However, the provision of additional fasteners requires a space on the substrate for threaded holes for the fasteners, with the result that space efficiency of the substrate is decreased.

The present invention is directed to providing an electric compressor that suppresses the vibration of the inverter substrate while maintaining the space efficiency of the inverter substrate.

SUMMARY OF THE INVENTION

There is provided an electric compressor including a compression mechanism, an electric motor driving the compression mechanism, a housing accommodating the compression mechanism and the electric motor, an inverter box located on an outer surface of the housing, an inverter substrate accommodated in the inverter box and having an inverter circuit supplying electric power to the electric motor, the inverter substrate having a first surface and a second surface that is a reverse surface of the first surface, a plurality of fastening members fixing the inverter substrate to the inverter box, and a reinforcing member having a first end fixed to the inverter box and a second end soldered to the first surface or the second surface of the inverter substrate. The reinforcing member extends toward the first surface or the second surface of the inverter substrate in the inverter box. The reinforcing member is not electrically connected to the inverter circuit of the inverter substrate.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE EMBODIMENTS

First Embodiment

Figure 1:
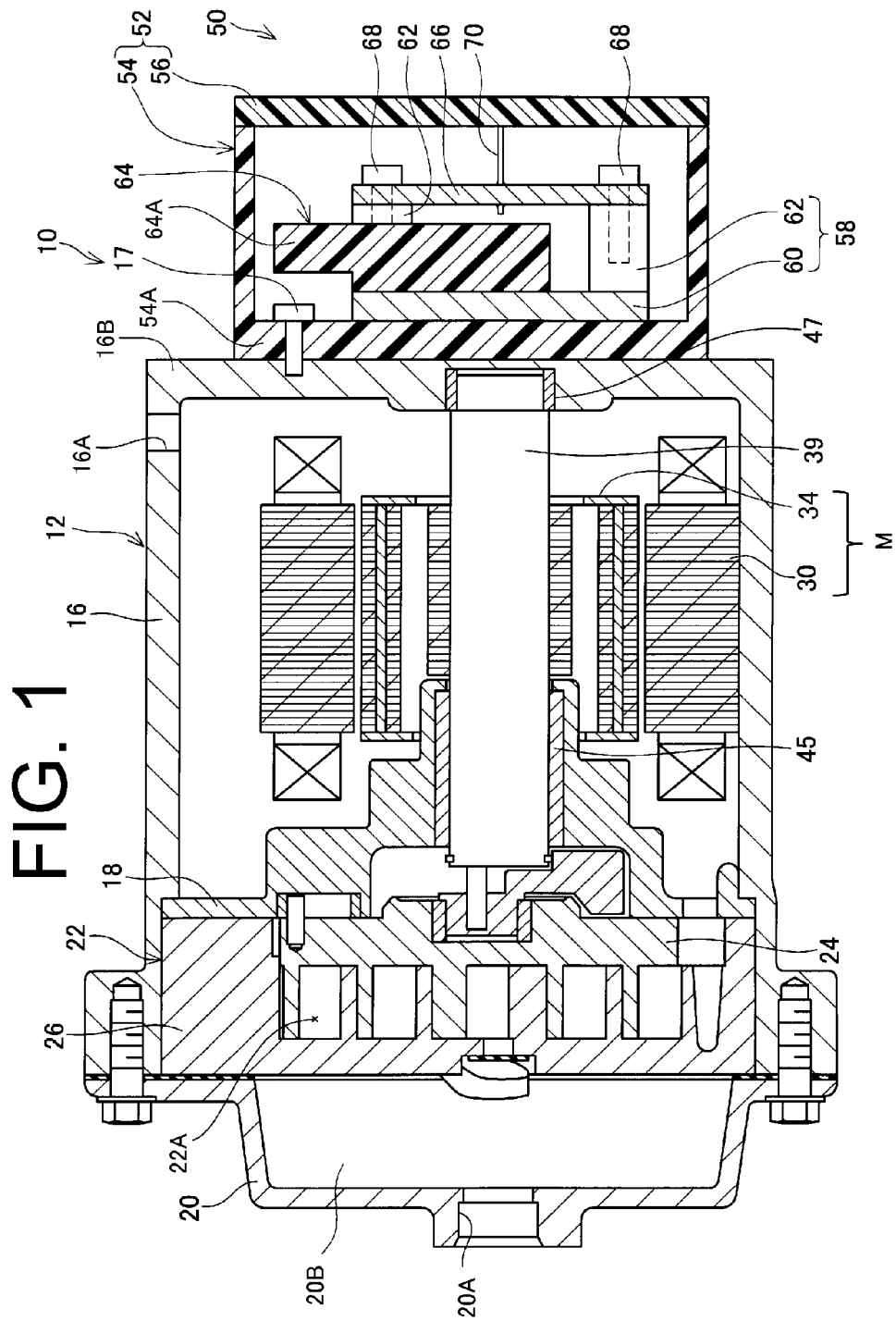
FIG. 1 is a longitudinal sectional view of an electric compressor according to a first embodiment of the present invention.
Figure 2:
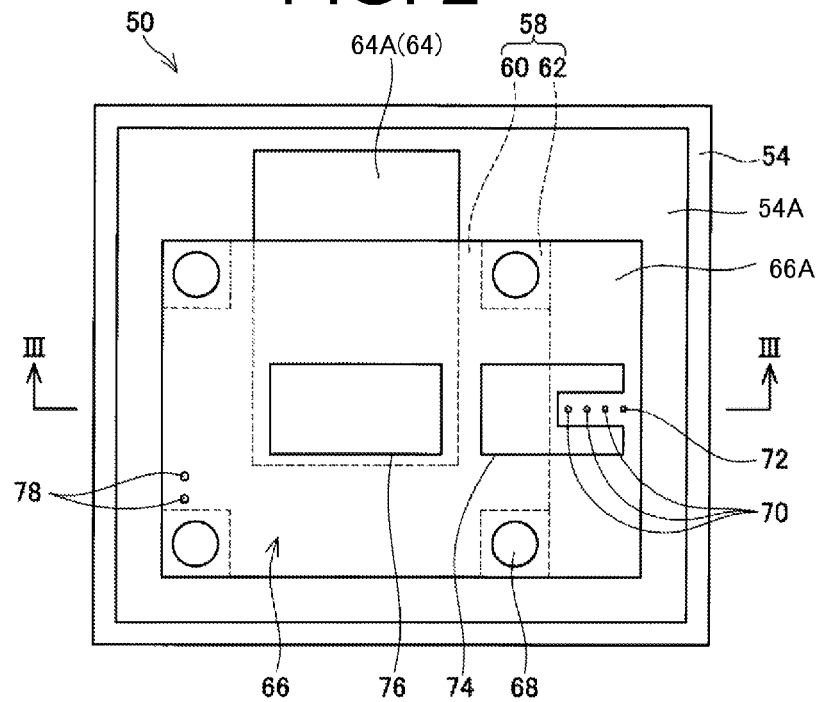
FIG. 2 is a schematic plan view of an inverter device of the electric compressor of FIG. 1.
Figure 3:
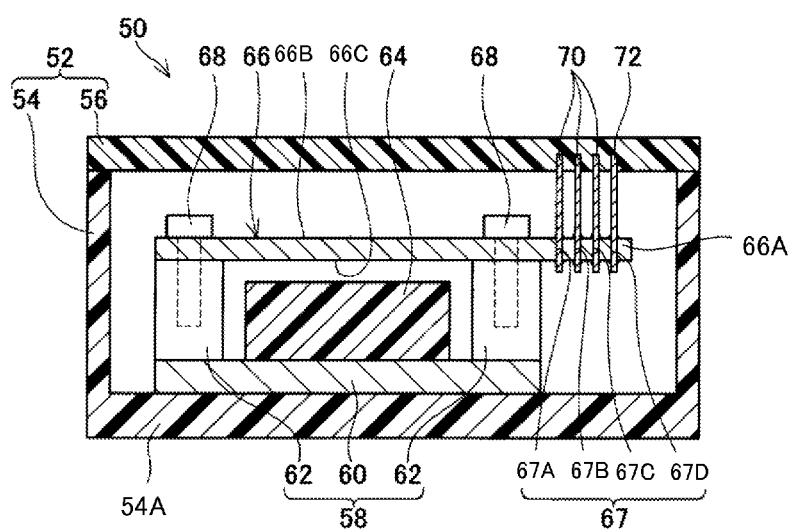
FIG. 3 is a sectional view taken along the line III-III in FIG. 2.

The following will describe the electric motor according to a first embodiment of the present invention with reference to FIG. 1 through FIG. 3. The electric compressor, which is designated generally by numeral 10, is adapted for use in an air conditioner mounted on an electric vehicle or a hybrid vehicle. It is noted that FIG. 1 partly omits diagrammatic representations of hatching showing section and that the cover 56 of an inverter box 52 is omitted in FIG. 2 for clarity of illustration. As shown in FIG. 1, the electric compressor 10 includes a housing 12 having a substantially cylindrical shape, a rotary shaft 39 rotatably supported in the housing 12, an electric motor M, a compression mechanism 22, and an inverter device 50 disposed on one end surface of the housing 12. The electric motor M and the compression mechanism 22 are accommodated in the housing 12. The rotary shaft 39 extends in the axial direction of the housing 12 (horizontal direction as seen in FIG. 1). The electric motor M is disposed in the housing 12 at a position adjacent to one end of the rotary shaft 39 (or the right end as seen in FIG. 1) and the compression mechanism 22 is disposed in the housing 12 at a position adjacent to the other end of the rotary shaft 39. That is, the electric motor M and the compression mechanism 22 are aligned with each other in the axial direction of the housing 12. As will be described later, the inverter device 50 supplies the electric motor M with electric power and the electric motor M drives the rotary shaft 39 thereby to drive the compression mechanism 22.

The housing 12 includes a motor housing 16 having a bottomed cylindrical shape, a front housing 18 mounted in the motor housing 16, and a discharge housing 20 fastened to the opened end of the motor housing 16.

The motor housing 16 is made of a metal such as aluminum alloy. The motor housing 16 has an inlet port 16A that is formed through the peripheral wall of the motor housing 16 at a position adjacent to a base wall 16B of the motor housing 16. A sliding bearing 47 is disposed in the base wall 16B of the motor housing 16 to rotatably support the rotary shaft 39 at one end thereof (right end as seen in FIG. 1). The inverter device 50 is mounted to the base wall 16B of the motor housing 16 outside the motor housing 16. It is noted that the base wall 16B of the motor housing 16 corresponds to an axial end surface of the housing that is adjacent to the electric motor in the present invention.

The front housing 18 is made of a metal such as aluminum alloy. The disposition of the front housing 18 in the motor housing 16 separates the interior of the motor housing 16 into the space accommodating the electric motor M and the space accommodating the compression mechanism 22. A sliding bearing 45 is disposed in the front housing 18 to rotatably support the rotary shaft 39 at the other end thereof (left side of FIG. 1).

The discharge housing 20 has a bottomed cylindrical shape and is made of a metal such as aluminum alloy. The discharge housing 20 has therein an outlet port 20A. With the discharge housing 20 fastened to the rear end of the motor housing 16, a discharge chamber 20B is formed between the compression mechanism 22 and the discharge housing 20. The discharge chamber 20B is in communication with the outside of the electric compressor 10 through the outlet port 20A. The housing 12 has therein a plurality of mounting lugs. The electric compressor 10 is fixedly mounted to an engine by fastening the mounting lugs to the engine by screws.

The rotary shaft 39 is accommodated in the housing 12. As described above, one end of the rotary shaft 39 is rotatably supported by the sliding bearing 47 disposed in the motor housing 16 and the other end is rotatably supported by the sliding bearing 45 disposed in the front housing 18.

The electric motor M is accommodated in the space on the right side of the front housing 18 that is adjacent to the base wall 16B of the motor housing 16. The electric motor M has a rotor 34 fixedly mounted on the rotary shaft 39 for rotation therewith and a stator coil 30 that is disposed radially outward of the rotor 34 and is formed by winding wires.

The compression mechanism 22 is disposed on the left side of the front housing 18 adjacent to the opened end of the motor housing 16. The compression mechanism 22 has a fixed scroll 26 fixed to the motor housing 16 and a movable scroll 24 disposed facing the fixed scroll 26. The fixed scroll 26 and the movable scroll 24 cooperate to form a compression chamber 22A between the wraps of the fixed and movable scrolls 24, 26 engaged with each other. The volume of the compression chamber 22A is changed according to the orbiting motion of the movable scroll 24. Refrigerant drawn into the compression chamber 22A from the space where the electric motor M is accommodated is compressed by the compression mechanism 22 and discharged out of the compressor through the discharge chamber 20B and the outlet port 20A.

The inverter device 50 includes an inverter box 52, a heat sink member 58 accommodated in the inverter box 52, a resin member 64, an inverter substrate 66, screws 68, and a bus bar 72 (FIG. 2). It is noted that the inverter substrate 66 may be referred to merely as "substrate 66." It is noted that the screw 68 corresponds to one example of a fastening member and the bus bar 72 corresponds to one example of the reinforcing member in the present invention.

The inverter box 52 includes a body 54 having a box shape and a cover 56 having a rectangular plate shape. The body 54 and the cover 56 are made of a resin such as polyphenylene sulfide (PPS). The body 54 has an opened end on the right side thereof (right side as seen FIG. 1) that is sealingly closed by the cover 56 that is fastened to the body 54 by screws (not shown). Thus, dustproofness and waterproofness of the inverter box 52 are secured. The cover 56 and the base wall 54A of the body 54 are disposed substantially parallel to each other. The body 54 is fixed to the base wall 16B of the motor housing 16 by a screw 17 with the entire surface of the base wall 54A in contact with the base wall 16B of the motor housing 16. The inverter box 52 is thus fixed to the housing 12. According to such configuration, the inverter box 52 may be easily assembled, as compared to the configuration in which the inverter box 52 is fixed to the peripheral wall of the housing 12 (specifically, the peripheral wall of the motor housing 16). Because the mounting surfaces of the base wall 54A of the inverter box 52 and the base wall 16B of the housing 12 are both flat, the inverter box 52 may be mounted to the housing 12 easily. Furthermore, the structure in which the inverter box 52 is mounted on the base wall 16B of the housing 12 permits the electric compressor 10 to be made smaller in radial direction and hence efficient utilization of the space in an engine compartment.

The heat sink member 58 includes a base 60 having a rectangular plate shape and four projections 62 each having a square cross section and extending perpendicularly from the respective four corners of the surface of the base 60. The base 60 and the projections 62 are made of a metal having a high heat conductivity such as aluminum alloy. The four projections 62 have substantially the same shape and the ends of the four projections 62 are positioned level with each other. The inverter substrate 66, which will be described in later part hereof, is fixed to the ends of the four projections 62 by four screws 68. The heat sink member 58 is fixed to the base wall 54A of the inverter box 52 by screws with the rear surface of the base 60 (or the left side surface as seen in FIG. 1) in contact with the base wall 54A. During the operation of the compressor, low-temperature refrigerant is flowed through the inlet port 16A into the space in the motor housing 16 in which the electric motor M is accommodated. The refrigerant flowing in the space accommodating the electric motor M cools the heat sink member 58 through the base wall 16B of the motor housing 16 and the base wall 54A of the inverter box 52. Thus, the heat generated by elements such as IGBT mounted on the inverter substrate 66 can be dissipated efficiently outside the inverter box 52 through the heat sink member 58.

The resin member 64 has a substantially rectangular parallelepiped shape and is made of a resin such as PPS (poly phenylene sulfide). The resin member 64 is disposed on the surface of the base 60 of the heat sink member 58 and fixed to the base 60 by screws. Specifically, the resin member 64 is fixed to the inverter box 52 indirectly through the heat sink member 58. The resin member 64 has a portion 64A that extends beyond one sides of the base 60 and the inverter substrate 66 toward a side wall (or the upper side wall as seen in FIG. 1) of the inverter box 52. (Portion of the resin member 64 other than the portion 64A is indicated by dashed lines in FIG. 2.) Coils, capacitors, and a connector (none being shown) are sealed by a resin in the resin member 64. The coils and the capacitors smooth the output (three phase AC power) from the inverter circuit 76 which will be described later. The connector is sealed by a resin in the portion 64A of the resin member 64 and electrically connected to the stator coil 30. The AC power smoothed by the coils and the capacitors is supplied to the stator coil 30 through the connector.

As shown in FIG. 2, the inverter substrate 66 has a substantially rectangular shape and is fixed to the projections 62 of the heat sink member 58 by the four screws 68 with a rear surface 66C (FIG. 3) of the inverter substrate 66 in contact with the ends of the projections 62. That is, the inverter substrate 66 is fixed to the inverter box 52 indirectly through the heat sink member 58. The inverter substrate 66 is disposed in substantially parallel to the base 60 of the heat sink member 58, as shown in FIG. 3. The thickness of the resin member 64 (or the dimension of the resin member 64 as measured along the axis of the rotary shaft 39 as seen in FIG. 1) except the portion 64A is smaller than that of the projection 62 of the heat sink member 58. Therefore, the resin member 64 is located between the inverter substrate 66 and the heat sink member 58 in the thickness direction of the inverter substrate 66. As shown in FIGS. 2 and 3, the overhanging portion 66A of the inverter substrate 66 extends in the longitudinal direction of the base 60 and overhangs beyond the right edge of the base 60 toward the side wall of the inverter box 52. That is, the overhanging portion 66A of the inverter substrate 66 is located outside a rectangular region surrounded by the four screws 68 in the inverter substrate 66.

As shown in FIG. 3, the overhanging portion 66A of the inverter substrate 66 has therethrough four holes 67(67A, 67B, 67C, 67D) extending in the thickness direction of the inverter substrate 66. The holes 67 are formed substantially at a center of the inverter substrate 66 in the direction along the short side of the rectangular shape thereof, spaced at a predetermined interval along the long side of the rectangular shape thereof. As shown in FIG. 3, lead terminals 70, which will be described later, are passed through the holes 67A-67C and soldered to the inverter substrate 66, and a bus bar 72 is passed through the hole 67D and soldered to the inverter substrate 66. An ECU (Electric Control Unit) (not shown in the drawing) is mounted on a vehicle at a position that is outside the inverter box 52. The lead terminals 70 are electrically connected to the ECU. Commands transmitted by the ECU are sent through the lead terminals 70 to a control circuit 74 which will be described later. It is noted that the front surface 66B of the inverter substrate 66 corresponds to one example of "first surface" of the inverter substrate and the rear surface 66C to one example of "second surface" of the inverter substrate, respectively, in the present invention.

As shown in FIG. 2, the control circuit 74 is provided in the inverter substrate 66, surrounding the holes 67 and the inverter circuit 76 is located substantially at a center of the inverter substrate 66. The control circuit 74 includes elements (not shown) that are operated with low voltage and electrically connected to the lead terminals 70. The inverter circuit 76 includes switching elements such as IGBT (not shown) that controls the switching operation of the elements. The inverter circuit 76 is electrically connected to the coils and the capacitors that are sealed by a resin in the resin member 64.

Two power supply terminals 78 are connected at one ends thereof to the inverter substrate 66 at positions adjacent to the screw 68 that is located at the lower left corner of the inverter substrate 66 in FIG. 2. Specifically, one ends of the terminals 78 are inserted in the holes (not shown) that are formed through the inverter substrate 66 and soldered. The other ends of the terminals 78 are electrically connected to a high-voltage power source (not shown) that is mounted outside the inverter box 52 in a vehicle and not shown in the drawing. DC power from the high-voltage power source is supplied through the terminals 78 to the inverter circuit 76 and converted to three phase AC power by the inverter circuit 76.

The inverter substrate 66 is fixed at four positions thereof to the projections 62 of the heat sink member 58 by the screws 68. Two of the four screws 68 are disposed at two corners that are located on the left short side of the rectangular of the inverter substrate 66. The other two screws 68 are disposed at positions of the inverter substrate 66 that are spaced leftward from the two corners on the right short side of the inverter substrate 66, as seen in FIG. 3. In other words, the inverter substrate 66 lies on the end surfaces of the projections 62 in the plan view of the inverter substrate 66. The inverter circuit 76 and a part of the control circuit 74 are located within the rectangular region that is defined by the four screws 68. On the other hand, the holes 67 are located outside the rectangular region.

As shown in FIG. 3, the cover 56 of the inverter box 52 and the inverter substrate 66 are connected by the three lead terminals 70 and one bus bar 72. The lead terminals 70 and the bus bar 72 have the substantially same shape and are made of the same metal such as cupper or aluminum alloy. Specifically, the lead terminal 70 and the bus bar 72 may be made by punching a metal plate. That is, the lead terminal 70 and the bus bar 72 may be made in the same process, so that manufacturing of the bus bar 72 dispenses with any additional process and, therefore, the increase of the manufacturing cost is suppressed.

One ends of the lead terminals 70 and one end of the bus bar 72 are fixed to the inner surface of the cover 56 of the inverter box 52. Specifically, the lead terminals 70 and the bus bar 72 are integrally fixed to the cover 56 by insert molding. The lead terminals 70 and the bus bar 72 extend perpendicularly to the inner surface of the cover 56 and located at positions corresponding to the respective holes 67 of the inverter substrate 66 as seen in plan view of the inverter device 50 as shown in FIG. 2. That is, the lead terminals 70 and the bus bar 72 are spaced at the same interval along the long side of the rectangular cover 56 and extend vertically to the front surface 66B of the inverter substrate 66.

The other ends of the three lead terminals 70 are passed through the respective holes 67A, 67B, 67C and soldered to the inverter substrate 66. Similarly, the other end of the bus bar 72 is also passed through the hole 67D and soldered to the inverter substrate 66. That is, the lead terminals 70 and the bus bar 72 are located on the same side of the inverter substrate 66, or the upper side of the inverter substrate 66 as seen in FIG. 3. The distance between the hole 67D and its adjacent hole 67C is the substantially same as the distance between any two adjacent holes of the holes 67A, 67B, 67C. That is, the bus bar 72 is soldered at a position adjacent to positions at which the lead terminals 70 are soldered. As described above, the lead terminals 70 are electrically connected to the control circuit 74 disposed around the lead terminals 70 and transmit commands sent from the ECU to the control circuit 74. Because the control circuit 74 is electrically connected to the inverter circuit 76, the lead terminals 70 are electrically connected to the inverter circuit 76. Though the bus bar 72 is physically connected at one end thereof to the cover 56 and at the other end thereof to the inverter substrate 66, respectively, the bus bar 72 is not connected to any circuit of the inverter substrate 66 including the ECU and the control circuit 74. It is noted that the positions of the holes 67A-67C corresponds to one example of "the reinforced region" and the position of the hole 67D corresponds to one example of "the portion of the inverter substrate that is adjacent to the reinforced region of the inverter substrate", in the present invention.

The following will describe the operation and effects of the above electric compressor 10. DC power supplied from the high-voltage power source is supplied through a terminal 78 to the inverter circuit 76 of the inverter substrate 66. The control circuit 74 controls switching of the inverter circuit 76 based on commands transmitted by the ECU. Accordingly, DC power supplied to the inverter circuit 76 is converted to three-phase AC power. AC power output by the inverter circuit 76 is smoothed through the coils and the capacitors that are sealed in the resin member 64 and then supplied to the electric motor M through the connector that is also sealed in the resin member 64. AC power is supplied to the electric motor M, so that the rotor 34 and hence the rotary shaft 39 start to rotate. The movable scroll 24 orbits by the rotation of the rotary shaft 39 and the volume of the compression chamber 22A between the movable scroll 24 and the fixed scroll 26 is changed. Refrigerant drawn through the inlet port 16A is flowed through the motor housing 16 in the axial direction of the rotary shaft 39 and introduced into the compression chamber 22A of the compression mechanism 22. The refrigerant compressed in the compression chamber 22A is discharged into the discharge chamber 20B and delivered out of the compressor 10 through the outlet port 20A.

The inverter device 50 of the electric compressor 10 has the bus bar 72 one end of which is fixed to the inverter box 52 and the other end of which is soldered to the inverter substrate 66. Therefore, transmission of vibration of the electric motor M, the vehicle, or the engine through the inverter box 52 to the inverter substrate 66, specifically to the part of the inverter substrate 66 where the bus bar 72 is soldered or the hole 67D, and the portion adjacent to the hole 67D, is suppressed. As a result, the durability of elements of the control circuit 74 that are mounted adjacent to the hole 67D is accomplished by suppressing the transmission of vibration to the inverter substrate 66. Because the bus bar 72 is fixed to the inverter substrate 66 by soldering, the area for mounting the bus bar 72 may be smaller than in the case that the bus bar 72 is fixed by a screw, so that the use of the bus bar 72 suppresses a decrease of the space efficiency of the inverter substrate 66. Furthermore, because the bus bar 72 is not electrically connected to any circuit of the inverter substrate 66, the bus bar 72 can be soldered at any desired position without considering layout and configuration of the circuit. As a result, the vibration of the inverter substrate 66 can be appropriately suppressed. The reduced mounting area of the bus bar 72 permits that the portion of the inverter substrate 66 that needs suppression of vibration may be arranged appropriately and the vibration of the inverter substrate 66 is suppressed more securely.

The inverter substrate 66 of the electric compressor 10 has therethrough the hole 67D and the other end of the bus bar 72 is soldered to the inverter substrate 66 through the hole 67D. Thus, soldering the bus bar 72 to the inverter substrate 66 permits dimensional tolerance of the inverter substrate 66 in the thickness direction thereof and tolerance of the bus bar 72 to be absorbed. As a result, occurrence of the stress of the inverter substrate 66 is suppressed.

Four screws 68 are used to fasten the inverter substrate 66. The vibration of the inverter substrate 66 at the portions thereof fastened by the screws 68 and the vicinities is suppressed. In the first embodiment, the overhanging portion 66A of the inverter substrate 66 is located outside the rectangular region surrounded by four lines extending between any two screws 68 located on each side of the rectangular. Vibration of the inverter substrate 66 is greater in the overhanging portion 66A that is outside the rectangular region surrounded by a plurality of screws than in the portion that is inside the rectangular region. In other words, the overhanging portion 66A is easier to be vibrated in the inverter substrate 66. The vibration of the overhanging portion 66A of the inverter substrate 66 may be suppressed by fastening the overhanging portion 66A by a screw similar to the screw 68. Because no portion of the heat sink member 58 is present facing the overhanging portion 66A, the overhanging portion 66A needs to be fastened to any member other the heat sink member 58. In this case, the inverter substrate 66 is fastened to two different members, namely, the heat sink member 58 and a member other than the heat sink member 58. For fastening the inverter substrate 66 to a plurality of members, the surfaces to which the members need to be level with each other, but actually it is difficult for the surfaces to be formed level. The inverter substrate 66 fastened to unlevel surface may be strained. The strain of the inverter substrate 66 may reduce the durability of parts mounted on the inverter substrate 66. However, in the electric compressor 10 of the present embodiment wherein the bus bar 72 is passed through the hole 67D and soldered to the inverter substrate 66 through the hole 67D of the inverter substrate 66, the occurrence of strain of the inverter substrate 66 is suppressed. Therefore, even if the member (or the heat sink member 58) to which the inverter substrate 66 is engaged by screws has the portion (or the overhanging portion 66A) to which screws are hardly engaged, the vibration of the inverter substrate 66 at a portion thereof that is difficult to be fastened to the heat sink member 58 (or the overhanging portion 66A) can be suppressed without straining the inverter substrate 66.

In the electric compressor 10, the bus bar 72 is soldered to the inverter substrate 66 at a position which is adjacent to the holes 67A, 67B, 67C and where the lead terminals 70 are soldered to the inverter substrate 66. This structure of the electric compressor 10 prevents breakage of the lead terminal 70 and peeling of the solder. The lead terminals 70 that are connected to the control circuit 74 having low-voltage elements are formed a relatively small diameter, which means that the lead terminals 70 that are connected to the overhanging portion 66A of the inverter substrate 66 are even more susceptible to vibration. However, the disposition of the bus bar 72 adjacent to the lead terminals 70 permits suppression of a decrease of the durability of the lead terminals 70 by the vibration of the inverter substrate 66.

In the electric compressor 10 having the lead terminals 70 and the bus bar 72 integrally molded in the inverter box 52 by insert molding, the lead terminals 70 and the bus bar 72 may be fixed to the cover 56 without using any fastening member such as a screw, with the result that the number of parts of the electric compressor 10 can be decreased and the manufacturing process can be simplified. The lead terminals 70 and the bus bar 72 extend in the same direction and are soldered at one ends thereof to the inverter substrate 66. The other ends of the lead terminals 70 and the bus bar 72 are soldered to the cover 56 of the inverter box 52. Therefore, in the configuration in which one ends of the lead terminals 70 and the bus bar 72 are soldered to the inverter substrate 66, stress occurs in the inverter substrate 66 in the direction toward the cover 56. According to the first embodiment, however, the stress that occurs in the inverter substrate 66 by the lead terminals 70 and the stress that occurs in the inverter substrate 66 by the bus bar 72 are directed in the same direction, so that the parts that are mounted at positions adjacent to the lead terminals 70 and the bus bar 72 are hard to be affected by the stresses and, therefore, the durability of the parts is secured.

Second Embodiment

Figure 4:
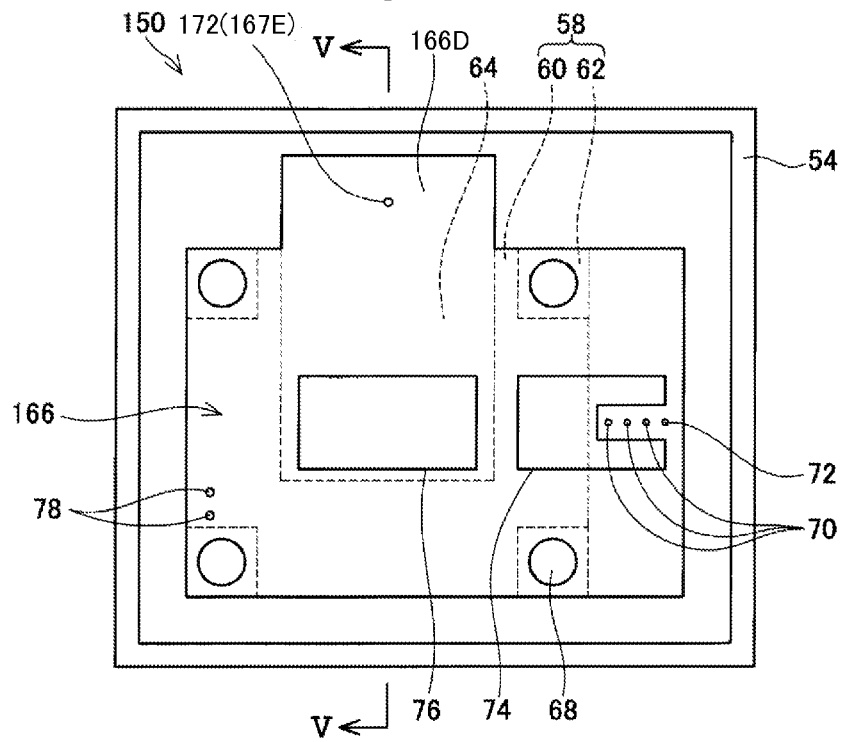
FIG. 4 is a schematic plan view of an inverter device according to a second embodiment of the present invention.
Figure 5:
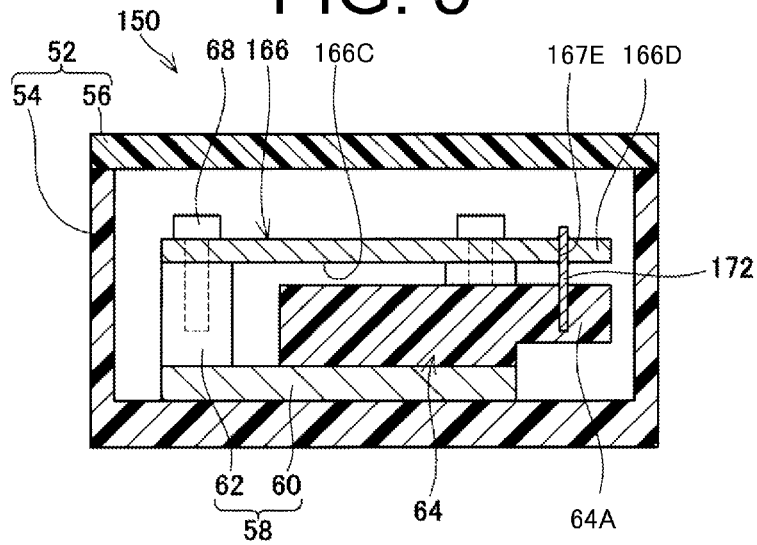
FIG. 5 is a sectional view taken along the line V-V in FIG. 4.

The following will describe the inverter device 150 according to the second embodiment with reference to FIGS. 4 and 5. In the drawings, the same reference numerals are used for the common elements or components in the first and the second embodiments, and the description of such elements or components of the second embodiment will be omitted. The same is true of the other embodiments. It is noted that FIGS. 4 and 5 are provided without diagrammatic representations of the cover 56 of the inverter box 52 and the terminals 78, respectively.

The shape of the inverter substrate 166 according to the second embodiment is different from that of the inverter substrate 66 according to the first embodiment. The inverter substrate 166 has an overhanging portion 166D overhanging from one long side of rectangular part of the inverter substrate 166 toward a side wall of the inverter box 52 and having mounted thereon electronic parts not shown. As shown in FIG. 5, the overhanging portion 166D faces the portion 64A of the resin member 64 and is spaced from the portion 64A of the resin member 64 at a distance in the thickness direction of the inverter substrate 66. The overhanging portion 166D of the inverter substrate 166 is connected to the portion 64A of the resin member 64 by a bus bar 172. Specifically, one end of the bus bar 172 is integrally molded in the portion 64A by insert molding. The bus bar 172 extends perpendicularly from the inverter substrate 166 through the inverter substrate 166. The other end of the bus bar 172 is passed through a hole 167E that is formed substantially at the center of the overhanging portion 166D and soldered to the inverter substrate 166. The bus bar 172 is not electrically connected to any circuits of the inverter substrate including the ECU and the control circuit 74. It is noted that the bus bar 172 and the rear surface 166C correspond to one example of "the reinforcing member" and one example of "the second surface of the inverter substrate", respectively, in the present invention.

The second embodiment offers the same advantageous effects as the first embodiment in that the bus bar 172 suppresses the vibration of the overhanging portion 166D of the inverter substrate 166 adjacent to the hole 167E. Therefore, the durability of the parts that are mounted in the overhanging portion 166D (especially the parts adjacent to the hole 167E) is prevented from being deteriorated by vibration. In manufacturing of a vehicle, a performance of the vehicle may be selectively added. For example, the substrate may be enlarged to permit mounting of an additional circuit. Enlarged portion (or a portion similar to the overhanging portion 166D) is located outside the rectangular region surrounded by four lines between any two screws 68 located on each side of the rectangular and, obviously, such a portion is easy to be vibrated. However, the configuration according to the second embodiment permits the vibration of the enlarged portion of the substrate to be suppressed without causing any strain to the substrate and without using any additional screws. In the second embodiment, one end of the bus bar 172 is integrally molded in the resin member 64 by insert molding and the spaced distance between the inverter substrate 166 and the resin member 64 is smaller than that between the inverter substrate 66 and the cover 56 of the inverter box 52, which improves the suppression of vibration of the overhanging portion 166D of the inverter substrate 166.

Third Embodiment

Figure 6:
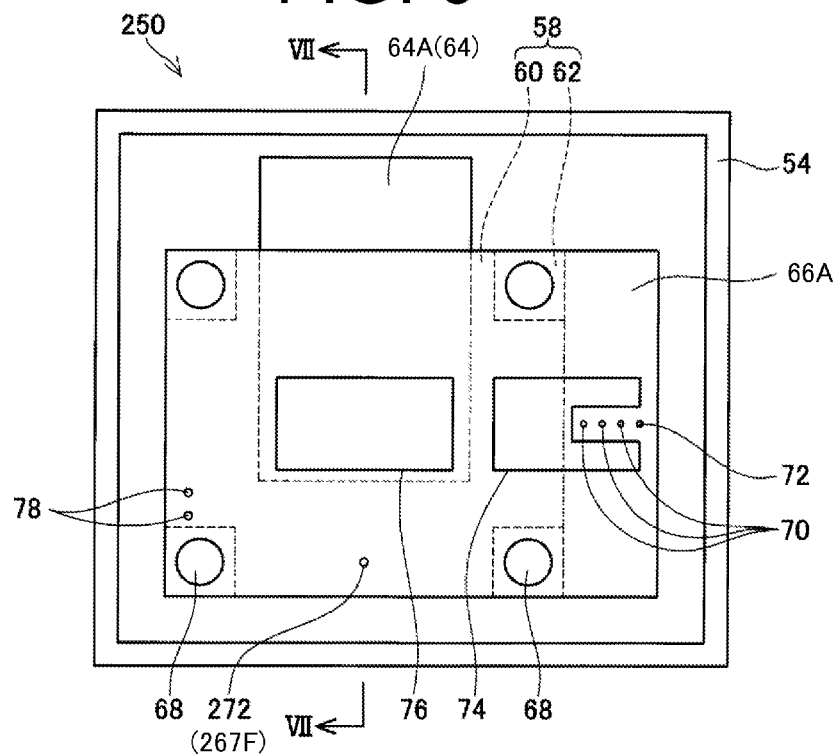
FIG. 6 is a schematic plan view of an inverter device according to a third embodiment of the present invention.
Figure 7:
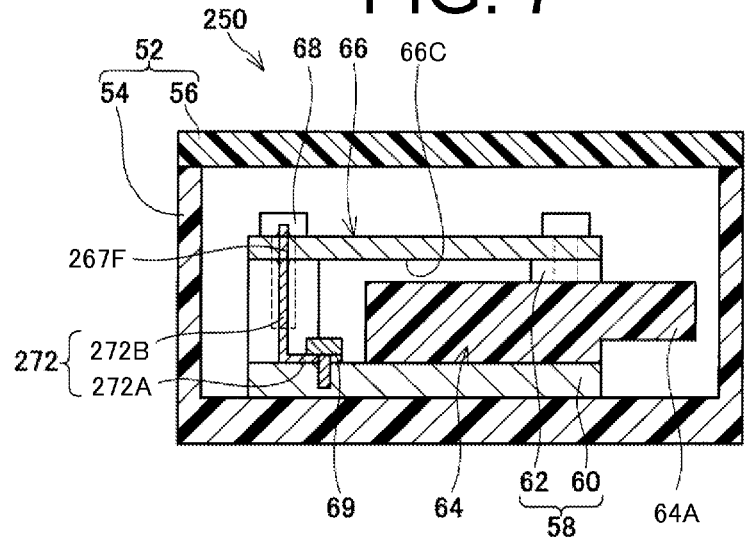
FIG. 7 is a sectional view taken along the line VII-VII in FIG. 6.

The following will describe the inverter device 250 according to the third embodiment with reference to FIGS. 6 and 7. It is noted that FIGS. 6 and 7 are provided without diagrammatic representations of the cover 56 of the inverter box 52 and the terminals 78, respectively. The inverter substrate 66 according to the third embodiment has therethrough a hole 267F formed substantially at the center between the two screws 68 that are located adjacent to the lower long side of the inverter substrate 66 of a rectangular shape as seen in FIG. 6. As shown in FIG. 7, portion of the inverter substrate 66 that is adjacent to the hole 267F faces the base 60 of the heat sink member 58 and is space therefrom at a distance. The inverter substrate 66 is connected to the base 60 of the heat sink member 58 by the bus bar 272. The bus bar 272 includes a first portion 272A that is disposed on the surface of the base 60 and having one end there fixed to the base 60 by a screw 69 and a second portion 272B that extends perpendicularly from the other end of the first portion 272A through the hole 267F of the inverter substrate 66. Specifically, the second portion 272B of the bus bar 272 is passed through the hole 267F and soldered at the end thereof to the inverter substrate 66. The bus bar 272 is not electrically connected to any circuit of the inverter substrate 66 including the ECU and the control circuit 74. It is noted that the bus bar 272 corresponds to one example of "the reinforcing member" of the present invention. The configuration according to the third embodiment offers the same advantageous effects as the first embodiment. In the third embodiment, the hole 267F is located substantially at the center between the two screws 68, or spaced away from either of the screws 68, so that, if no reinforcing member such as the bus bar 272 is provided, the inverter substrate 66 is easy to be vibrated at a position in the region thereof that is adjacent to the hole 267F. The provision of the bus bar 272 soldered to the inverter substrate 66 substantially at the center between the two screws 68 prevents the durability of the parts mounted at positions adjacent to the hole 267F from being deteriorated by vibration.

Although the present invention has been described in the context of the embodiments illustrated in FIGS. 1 through 7, the invention is not limited to such embodiments, but it may be changed and modified in various ways within the scope of the invention, as exemplified below.

Although in the embodiments, the bus bar 72 is passed through the hole 67 and soldered to the inverter substrate 66, the present invention is not limited to this structure. The inverter substrate 66 may have no hole 67 and the other end of the bus bar 72 may be soldered to the front surface 66B of the inverter substrate 66.

The lead terminal 70 need not extend straight, but may be bent, for example, at a right angle. In this case, the bent portion of the lead terminal 70 may be molded in the cover 56 of the inverter box 52 by insert molding to secure the vibration resistance of the lead terminal 70.

One end of the bus bar 72 may be molded in the base wall 54A of the body 54 instead of being molded in the cover 56 of the inverter box 52 by insert molding. Alternatively, the one end of the bus bar 72 may be fixed to any other parts, for example, the resin member 64 or the heat sink member 58 that are fixed to the inverter box 52. The bus bar 72 may be located across the inverter substrate 66 from the lead terminal 70.

The inverter box 52 may be made of a metal such as aluminum alloy. The motor housing 16 and the body 54 of the inverter box 52 may be integrally made of an aluminum alloy and the cover 56 of the motor housing 16 may also be made of an aluminum alloy. The cover 56 made of a resin such as PPS may be combined with the integral motor housing 16 and the inverter box 52 made of aluminum alloy. A connector connected to the cover 56 of the inverter box 52 by a bolt may be used instead of the lead terminal 70. Commands sent from generated by the ECU are transmitted to the control circuit 74 through the connector. In this structure, the connector has therein a bus bar disposed side by side with pins. The bus bar provided in the connector can suppress the vibration of the inverter substrate 66 thereby to secure the durability of the connector pins.

As long as the heat generated by the elements mounted on the inverter substrate 66 can be dissipated efficiently out of the inverter box 52, the inverter device 50 may dispense with the heat sink member 58 and the inverter substrate 66 may be fixed directly to the inverter box 52 by a screw.

Though the inverter device 50 is fixed to the base wall 16B of the motor housing 16 in the first through third embodiments, the inverter device 50 may have such a structure that the motor housing 16 have no base such as 16B and the opened end of the motor housing 16 is closed by the base wall 54A of the inverter box 52. In other words, the base wall 54A of the inverter box 52 plays the role of the base wall of the motor housing 16.

The inverter device 50 may be fixed to the peripheral wall of the housing 12 instead of the base wall 16B of the motor housing 16. In this case, the inverter device 50 should be preferably fixed to the peripheral wall of the housing 12 at a position adjacent to the electric motor M rather than the compression mechanism 22.

The fastening member is not limited to a member such as the screw 68, but a bolt and a nut may be used to connect the inverter substrate 66 to the heat sink member 58 by a bolt and a nut.

In the second and the third embodiments, a plurality of bus bars (or the bus bar 72 and the bus bar 172) may be soldered to the substrate. One ends of these bus bars may be fixed to different members, respectively. These bus bars may be located at opposite sides of the substrate.

Therefore, the present examples and embodiments are to be considered as illustrative and not restrictive, and the invention is not to be limited to the details given herein but may be modified within the scope of the present invention.

What is claimed is:

1. An electric compressor comprising:
    a compression mechanism;
    an electric motor driving the compression mechanism;
    a housing accommodating the compression mechanism and the electric motor;
    an inverter box located on an outer surface of the housing;
    an inverter substrate accommodated in the inverter box and having an inverter circuit supplying electric power to the electric motor, the inverter substrate having a first surface and a second surface that is a reverse surface of the first surface;
    a resin member and a heat sink member accommodated in the inverter box;
    a plurality of fastening members fixing the inverter substrate to the inverter box;
    a plurality of lead terminals; and
    a reinforcing member having a first end fixed to the inverter box, the resin member, or the heat sink member, and a portion on a second end soldered to the first surface or the second surface of the inverter substrate,
    wherein the reinforcing member is not electrically connected to the inverter circuit of the inverter substrate,
    wherein the plurality of lead terminals are soldered to the inverter substrate and electrically connected to the inverter circuit of the inverter substrate,
    wherein the plurality of lead terminals are spaced along a direction on the inverter substrate,
    wherein the reinforcing member is soldered to the inverter substrate at a position where the reinforcing member is spaced from the plurality of lead terminals along the direction,
    wherein at least one of the plurality of lead terminals has a first end fixed to the inverter box and a portion on a second end soldered to a reinforced region of the inverter substrate, and
    wherein the portion of the second end of the reinforcing member is soldered to a portion of the inverter substrate that is adjacent to the reinforced region of the inverter substrate.

2. The electric compressor according to claim 1, wherein the inverter substrate has a hole extending from the first surface to the second surface of the inverter substrate, and wherein the second end of the reinforcing member is soldered to the inverter substrate through the hole.

3. The electric compressor according to claim 1, wherein the first end of the reinforcing member is fixed directly to the inverter box.

4. The electric compressor according to claim 1, wherein the inverter box is made of a resin, wherein the reinforcing member is made of a same material as a lead terminal of the plurality of lead terminals, and wherein the first end of the reinforcing member and the lead terminal are molded in the inverter box by insert molding and located on a same side of the inverter substrate.

5. The electric compressor according to claim 1, wherein the resin member accommodates a coil and a capacitor that are electrically connected to the inverter substrate, and wherein the resin member is fixed to the inverter box.

6. The electric compressor according to claim 1, wherein the heat sink member dissipates heat generated from elements mounted in the inverter substrate out of the inverter box, and wherein the heat sink member is fixed to the inverter box.

7. The electric compressor according to claim 1, wherein the reinforcing member is a bus bar.

8. The electric compressor according to claim 1, wherein the housing is of a cylindrical shape, wherein the compression mechanism and the electric motor are aligned with each other in an axial direction of the housing, and wherein the inverter box is disposed on an axial end surface of the housing that is adjacent to the electric motor.

\* \* \* \* \*